UNITED STATES PATENT OFFICE.

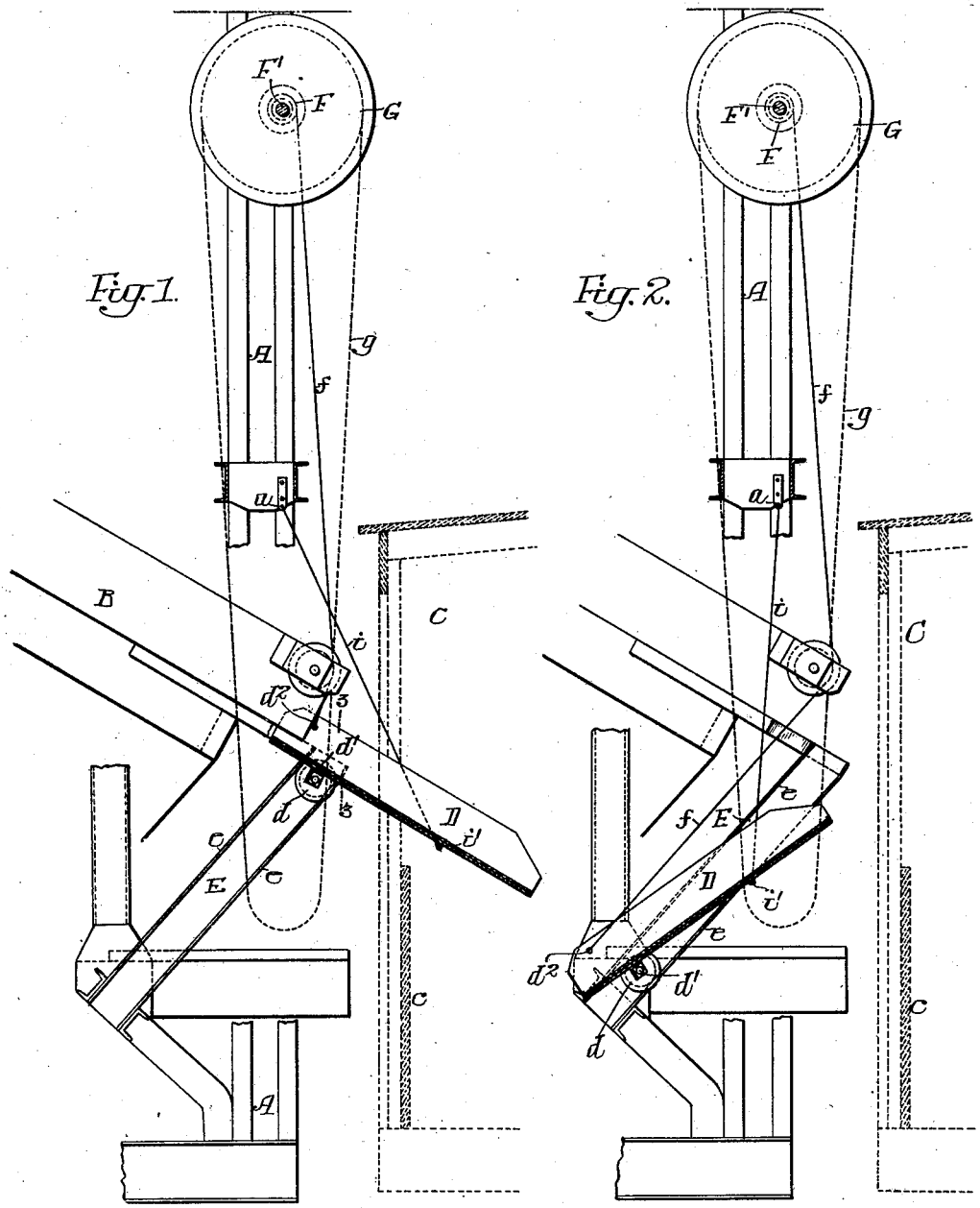

RICHARD W. WETHERILL, OF AMBLER, PENNSYLVANIA, ASSIGNOR TO THE J. M. DODGE COMPANY, OF NAUGATUCK, CONNECTICUT, A CORPORATION OF CONNECTICUT.

ADJUSTABLE CHUTE FOR CAR-LOADERS.

978,803.  Specification of Letters Patent.  Patented Dec. 13, 1910.

Application filed June 7, 1909. Serial No. 500,645.

*To all whom it may concern:*

Be it known that I, RICHARD W. WETHERILL, a citizen of the United States, residing in Ambler, Pennsylvania, have invented certain Improvements in Adjustable Chutes for Car-Loaders, of which the following is a specification.

The object of my invention is to provide a chute which can be projected through a comparatively small opening and retracted, as the cars, which my invention is especially designed to load, are what are known as box-cars; the half door being placed in position and the chute projected into the car through the doorway between the upper edge of the half-door and the top of the car.

In the accompanying drawing:—Figure 1, is a side view partly in section, illustrating my improved chute in position to receive coal and discharge it into the body of a car; Fig. 2, is a view similar to Fig. 1, showing the chute retracted clear of the car body; and Fig. 3, is a sectional view on the line 3—3, Fig. 1.

A is the frame of the structure.

B is the permanent chute made in any form desired.

C is the car to be loaded; the car being shown by dotted lines, and $c$ is the half-door or grain door, as cars of this type are only filled with granular material to about one-half capacity.

D is an adjustable chute forming a continuation of the chute B, and when projected, as in Fig. 1, extends into the body of the car.

E, E are the guides for the chute, being made of channel bars in the present instance, forming rails $e, e$ between which are mounted the flanged wheels $d$ carried by the axle $d'$ adapted to bearings on the underside of the chute D. The wheels $d$ travel in the guides E when the chute is moved from the position shown in Fig. 1 to that shown in Fig. 2.

$i, i$ are suspension rods, one at each side in the present instance, and the suspension rods are pivoted at $a$ to the permanent framework A and pivoted at $i'$ to the chute D, at a point near its outer end, so that the chute swings in or out on the pivot as the rear of the chute is turned by being guided by the rails $e, e$.

The inner end of the chute is connected at $d^2$ to a rope or chain $f$, which passes around a sheave F on a shaft F' mounted in bearings on the frame A. The shaft is turned by a chain $g$ passing around a chain sheave G, also on the shaft F'. This chain $g$ extends to a point within easy access of the operator, so that on turning the chain the rear end of the chute D can be raised or lowered, as indicated in Figs. 1 and 2.

When the chute is in the position illustrated in Fig. 1, and it is wished to retract it, all that is necessary is to slacken the rope $f$ allowing the rear end of the chute to travel down the inclined guides E; this raises the outer end of the chute and it is moved out of the car and swings clear of it as it moves to the position shown in Fig. 2. When it is wished to project the chute, the chain wheel is moved in the opposite direction and the chute is moved forward and projected into the car, and by continuing the movement the rear end of the chute is drawn up into position under the fixed chute B.

I claim:—

The combination of a supporting structure, a fixed chute, a movable chute, a cord connecting a fixed point on the supporting structure with a fixed point on the movable chute, a fixed guide, a roller on the movable chute and operable on the guide, and a rope connected to the rear of the movable chute for controlling the projection and retraction of the same.

In testimony whereof, I have signed my name to this specification, in the presence of two subscribing witnesses.

RICHARD W. WETHERILL.

Witnesses:
 WM. E. SHUPE,
 WM. A. BARR.